United States Patent
Lee

(10) Patent No.: US 7,827,107 B2
(45) Date of Patent: *Nov. 2, 2010

(54) METHOD AND SYSTEM FOR VERIFYING USE OF A FINANCIAL INSTRUMENT

(75) Inventor: Timothy M. Lee, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/249,315

(22) Filed: Oct. 10, 2008

(65) Prior Publication Data

US 2009/0099966 A1 Apr. 16, 2009

Related U.S. Application Data

(63) Continuation-in-part of application No. 11/871,870, filed on Oct. 12, 2007, now Pat. No. 7,519,557.

(51) Int. Cl.
*G06Q 40/00* (2006.01)
(52) U.S. Cl. .................. 705/44; 705/1; 705/26; 705/39; 705/30
(58) Field of Classification Search .......... 705/1, 705/26, 30, 36, 44; 235/379; 707/1, 10, 707/100, 104
See application file for complete search history.

(56) References Cited

U.S. PATENT DOCUMENTS

2001/0051917 A1* 12/2001 Bissonette et al. ........... 705/39
2007/0051795 A1* 3/2007 Shipman .................. 235/379

FOREIGN PATENT DOCUMENTS

AU 2001271968 3/2007
WO 02/05224 1/2002

OTHER PUBLICATIONS

PCT International Search Report of PCT International Application No. PCT/US01/21725, Aug. 29, 2002, 2 pages.

* cited by examiner

*Primary Examiner*—Mary Cheung
*Assistant Examiner*—John H Holly
(74) *Attorney, Agent, or Firm*—Harry K. Ahn; Abelman Frayne & Schwab

(57) ABSTRACT

A system of verifying a purported registrant's ownership or control of a payment instrument includes a communication device, a memory and a processor coupled to the communication device and to the memory. A payment instrument verification module stored in the memory and executable by the processor is adapted to receive information relating to the payment instrument from a registrant, initiate a financial transaction involving the payment instrument via the communication device, generate a dispute amount for the financial transaction, receive via the communication device a notification from a financial institution of the registrant that the financial transaction has been disputed by a comparison amount and compare the comparison amount with the dispute amount for purposes of verifying the payment instrument.

20 Claims, 3 Drawing Sheets

METHOD AND SYSTEM FOR VERIFYING USE OF A FINANCIAL INSTRUMENT

CROSS-REFERENCE TO RELATED APPLICATION

The present application is a continuation-in-part application of commonly owned and assigned U.S. patent application Ser. No. 11/871,870, filed Oct. 12, 2007 now U.S. Pat. No. 7,519,557, which is incorporated herein by reference.

FIELD OF THE INVENTION

The present invention relates to automated financial services, and in particular relates to a method and system for verifying use of a financial instrument.

BACKGROUND OF THE INVENTION

With ever greater frequency, payment instruments are replacing cash as the medium of exchange in commercial and financial transactions. Additionally, an increasing percentage of transactions are taking place at a distance over computer networks such as the Internet. Since payment instruments are subject to theft and fraudulent use, it is possible for unauthorized persons to make use of a payment instrument before the authorized user or owner of the instrument can become aware that the payment instrument has been compromised.

One method known to reduce these risks is to require the use of a second verification method, such as a password in personal identification number (PIN) known only to the authorized user, with every transaction. This is inconvenient, however, as a user may need to remember numerous PINs for multiple payment instruments. It may also require payment systems to be redesigned.

Another method to bolster security is for the desired recipient of funds in a transaction to initiate a 'test' transaction using the payment instrument in question, for example, a de minimus deposit or debit of unpredictable amount. Only by contacting the financial or other institution associated with the payment instrument and authenticating one's identity can one learn the nature and amount of the test transaction, thus only an authorized user can learn the amount. Once the amount of the test transaction is ascertained, the authorized user can then submit the information back to the desired recipient which can determine that the submitted amount is the same as the amount of the test transaction. One drawback with this method is that an actual transfer of value may take place, or multiple transactions may be required. Moreover, this method may require financial institutions to perform systems integration, process changes, and retraining of customer service staff. Another drawback is that, in theory, the test transaction amount may be guessed or otherwise predicted.

It would be desirable to provide methods and systems for verifying the authority to use a payment instrument that does not suffer from the drawbacks of the methods discussed above.

SUMMARY OF THE INVENTION

In a first aspect, the present invention provides a system of verifying a purported registrant's ownership or control of a payment instrument that includes a communication device, a memory and a processor coupled to the communication device and to the memory. A payment instrument verification module stored in the memory and executable by the processor is adapted to receive information relating to the payment instrument from a registrant, initiate a financial transaction involving the payment instrument via the communication device, generate a dispute amount for the financial transaction, receive via the communication device a notification from a financial institution of the registrant that the financial transaction has been disputed by a comparison amount and compare the comparison amount with the dispute amount for purposes of verifying the payment instrument.

In a second aspect, the present invention provides a method by a registering service to verify use of a payment instrument belonging to a registrant that includes receiving information relating to the payment instrument from the registrant, initiating a financial transaction with an issuer of the payment instrument, notifying the registrant of a dispute amount related to the financial transaction, receiving a notification from the issuer that the financial transaction has been disputed by a comparison amount, comparing the comparison amount to the dispute amount and verifying use of the payment instrument based on a result of the comparison.

In a third aspect, the present invention provides a method by an issuer of a payment instrument belonging to a registrant to facilitate verification of the payment instrument with a registering service. The method includes receiving a request for a financial transaction on the payment instrument from the registering service, receiving a communication from the registrant disputing the financial transaction by a dispute amount, determining whether the registrant is authorized to use the payment instrument and notifying the registering service of a dispute of the financial transaction if it is determined that the registrant is authorized to use the payment instrument, the notification including the dispute amount.

DETAILED DESCRIPTION

The term 'payment instrument' as used herein denotes a financial instrument or account which can be used in financial transactions. The payment instrument may be a tangible financial presentation device such as a credit or debit card, or it may be embodied intangibly as information (e.g., as a financial account number).

The term 'registrant' as used herein denotes any party claiming to have authority to engage in a financial transaction using a payment instrument. The registrant is typically a user or holder of the payment instrument.

The term 'registering service' as used herein denotes an entity to which the registrant represents that the registrant has authority to use a payment instrument. For example, and without limitation, the registering service may be a payment service provider such as Paypal and Billpoint which provides payments to online merchants either by using the registrant's payment instrument, or by using the registrant's own account established with the registering service. The registrant's own account may hold registrant's own funds, possibly transferred from the registrant's verified payment instrument.

The term 'financial institution' as used herein denotes the issuer or verifying authority associated with a particular payment instrument. For example, and without limitation, the financial institution may be a bank.

Figure 1:
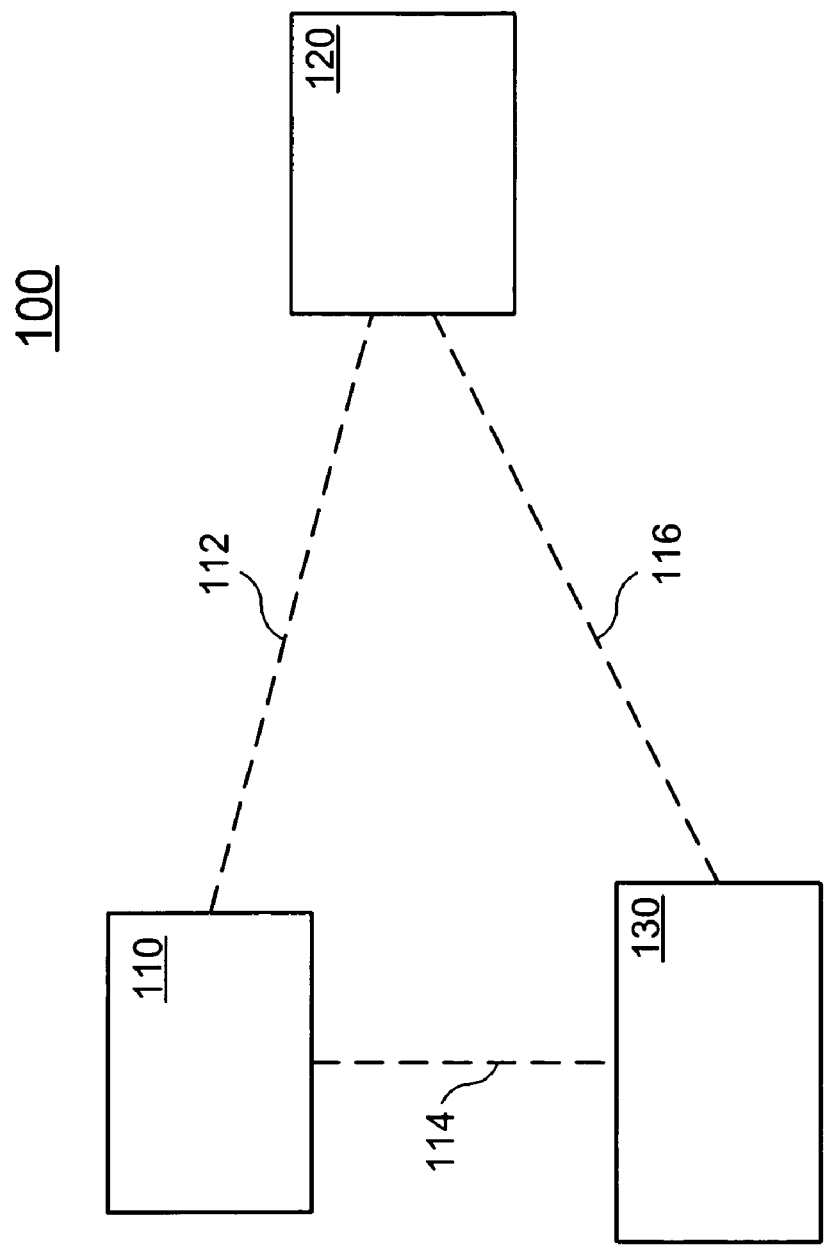
FIG. 1 is a block diagram of a system for verifying use of a payment instrument according to an embodiment of the present invention.

Referring to FIG. 1, a block diagram of a system for verifying use of a financial instrument according to the present invention is shown. In the system 100, a registrant 110 is coupled via a communication link 112 to a registering service 120 for the purpose of signing up with the registering service 120. The registrant 110 is the owner of a payment instrument; the registrant seeks to use the payment instrument in its transactions with the registering service 120. The registrant 110 is also coupled to a financial institution 130 which is associated with (e.g., is the issuer of) the payment instrument. The registrant 110 may be coupled to the financial institution 120 via another communication link 114, which may be a secure wired or wireless data communication over a data network or a telecommunication link. The registering service 120 is also coupled to the financial institution 130 via a communication channel 116.

Figure 2:
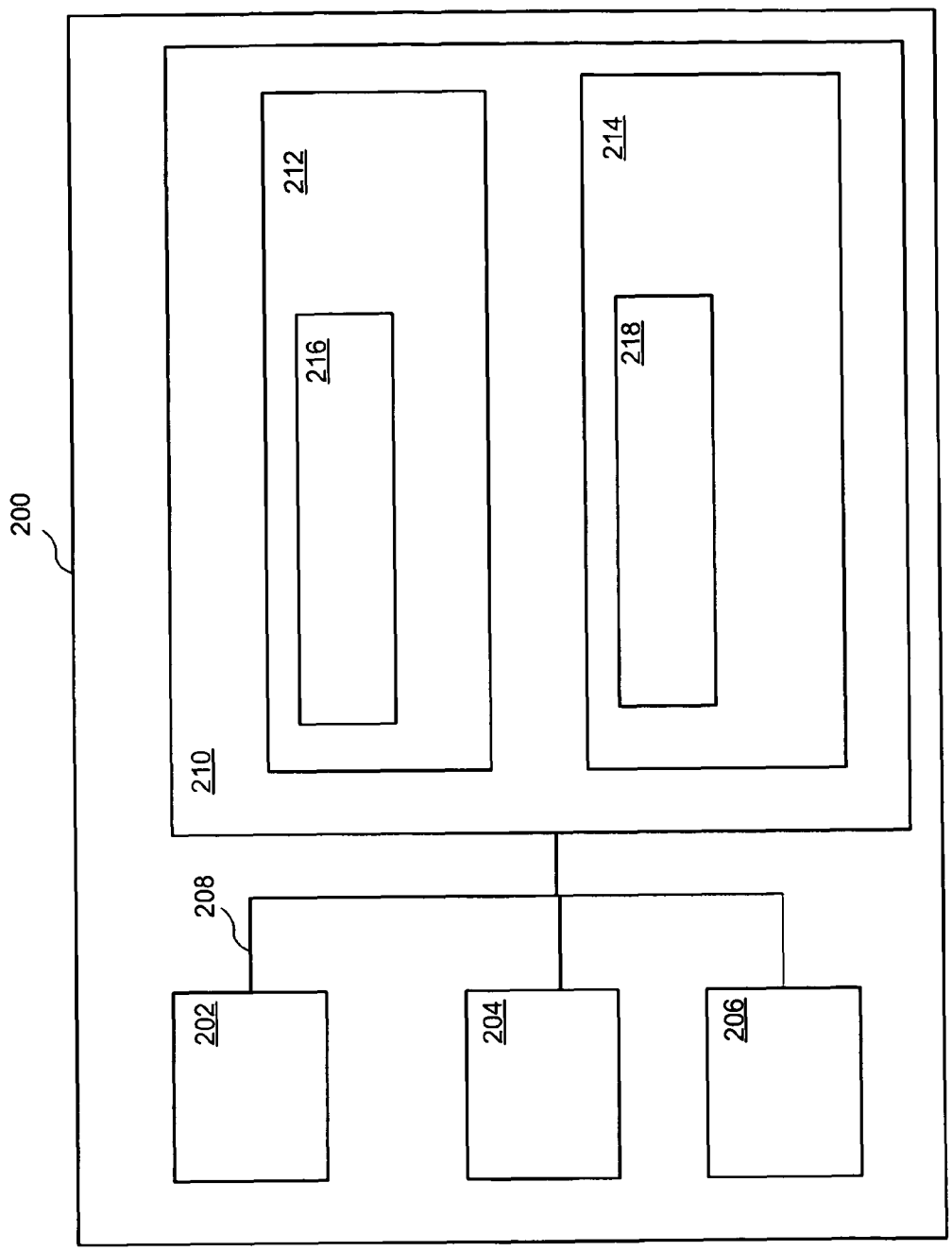
FIG. 2 is a block diagram of a registering service server according to an embodiment of the present invention.

FIG. 2 is a block diagram of a computer system that may be implemented by the registering service according to embodiments of the present invention. As shown in FIG. 2, the computer system 200 includes a processor 202, such as a central processing unit (CPU), a communication device 204 which sends/receives information via communication links 112, 116 and support circuitry 206. The processor 202, communication device 204 and support circuitry 206 are commonly connected to a bus 208 which also connects to a memory 210.

The memory 210 may include both volatile (RAM) and non-volatile (ROM) memory units and may also include hard disk and backup storage capacity. The memory 210 stores software programs in a program storage portion 212 and stores data in a data storage portion 214. The program storage portion 212 includes a payment instrument verification module 216. The payment instrument verification module 216 includes software instructions for performing the payment instrument verification method according to the present invention discussed below. The data storage portion 214 includes memory units 218 allocated to store information generated by the payment instrument verification module 216.

It is to be appreciated that the computer system 200 of the registering service 120 may comprise any computer such as a personal computer, minicomputer, workstation or mainframe, or a combination thereof. While the computer system 200 is shown, for illustration purposes, as a single computer unit, the system may comprise a group/farm of computers which can be scaled depending on the processing load. Also, similar computer systems can be used by the registrant 202 and financial institution 130.

The registering service 120 may be an online payment provider such as, for example, Paypal™ In some embodiments, the link 112 may comprise a secure local or wide area data network connection (e.g., a connection over the Internet). However, the registrant 110 may also contact the registering service in person, or via telephone. The registrant 110 may elect to use a particular payment instrument in future transactions with the registering service, and for this purpose, the registrant 110 submits information related to the payment instrument to the registering service 120 over link 112 to sign up for the payment service.

Figure 3:
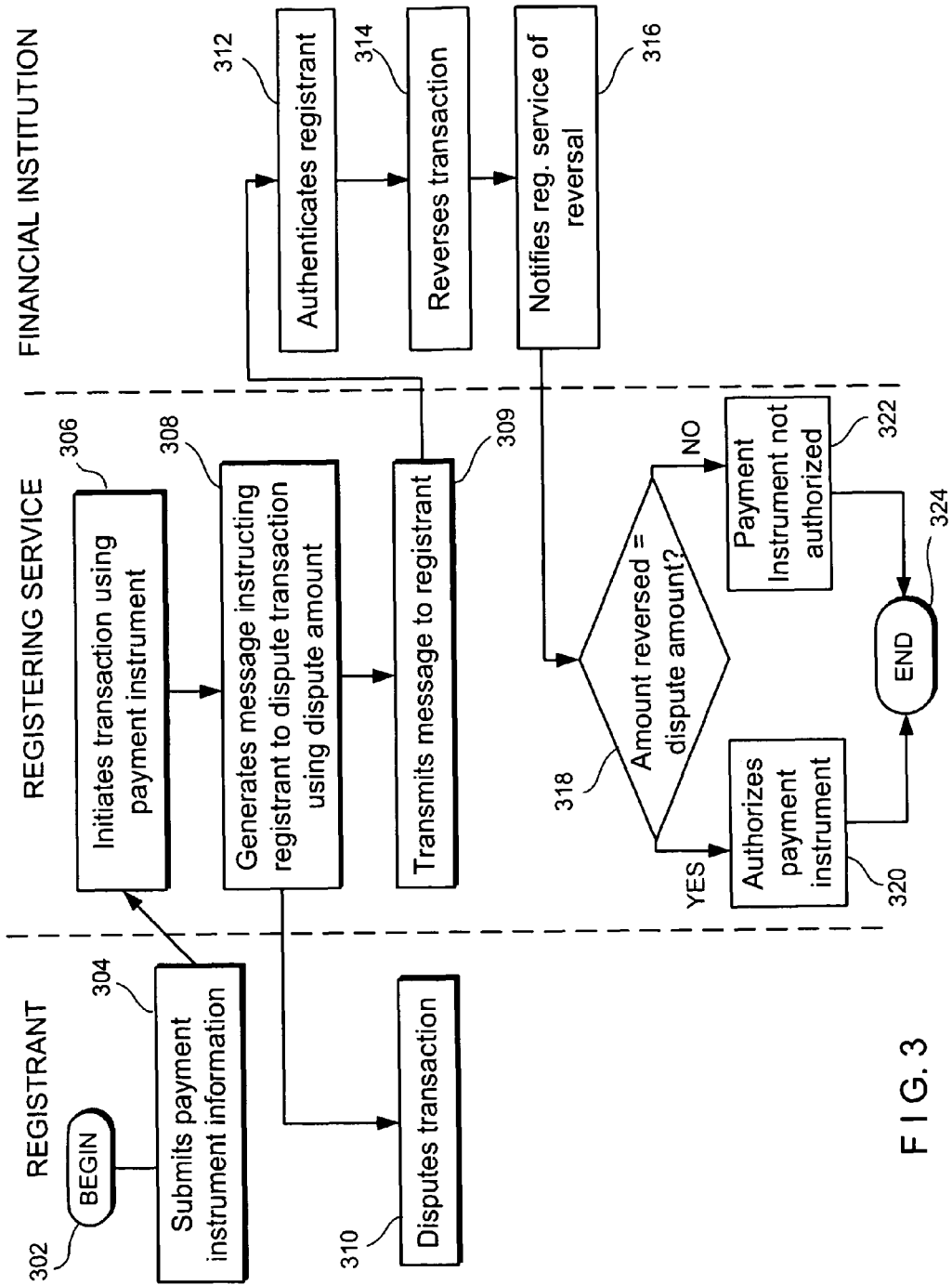
FIG. 3 is a flow chart of a method of verifying use of a payment instrument according to an embodiment of the present invention.

Referring now to FIG. 3, which is a flow diagram of a method 300 of verifying a payment instrument according to an embodiment of the present invention, in step 302, the method begins. In step 304, the registrant 110 submits payment instrument information to the registering service 120. The payment instrument information includes at least a user name, an account number, and the identity of the issuer financial institution. In the following step 306, the payment instrument verification module 216 of the registering service 120 initiates a financial transaction (e.g., a credit or debit) of a certain nominal dollar amount with financial institution 130 through finance services network 116 or using other appropriate means using the payment instrument information it has received from the registrant 110. If the payment instrument is a debit or credit card, the financial transaction is initiated through the debit or credit card transaction processing network such as an Automated Clearing House (ACH) network for a debit card or Visanet™ for a credit card. Additionally, in step 308, the payment instrument verification module 216 generates a message including instructions to the registrant 110 to dispute an amount, termed herein the 'dispute amount', which may be preset or randomly generated. The dispute amount may comprise the entire nominal amount of the financial transaction or only a specific portion thereof. The registering service 120 then transmits the message to the registrant 110 over link 112 in step 309.

Upon receiving the message (including the dispute amount) from the registering service 120, in step 310 the registrant 110 contacts the financial institution 130 over communication link 114 to dispute the financial transaction, specifically providing the payment instrument details and the dispute amount to the financial institution 130.

In step 312, the financial institution 130 authenticates the registrant 110 by determining whether the registrant 110 is authorized to use the payment instrument. Once the registrant 110 is authenticated, the financial institution 130 processes the dispute in step 314 and may reverse or partially reverse the financial transaction according to the disputed amount. In step 316, the financial institution 130 notifies the registering service 120 which initiated the financial transaction that the transaction has been disputed by an amount which is denoted as the 'comparison amount'. Upon receipt of the notification, in step 318 the payment instrument verification module 216 of the registering service 120 confirms whether the comparison amount indicated in the notification is the same as the stored dispute amount which it originally generated. Equality between the comparison amount and the dispute amount indicates that the registrant 110 is authorized to use the payment instrument issued by the financial institution. This is the case because the correct dispute amount can only make the full circle from the registering service 120 to the registrant 110 to the financial institution 130 and then back to the registering service 120 if the registrant has an account with (e.g., is authorized by) the financial institution 130.

If it is determined in step 318 that the comparison amount is equal to the dispute amount, in step 320 the registering service 120 authorizes use of the payment instrument for future. If it is determined, in step 318, that the comparison amount is not equal to the dispute amount, then in step 322, the registering service notifies the registrant that the payment instrument is not authorized for further transactions. After step 320 or 322, the method ends in step 324.

The system and method described above enables authorization of a payment instrument without a transfer of value since the financial transaction initiated by the registering service 120 may be reversed if the registrant 110 disputes the full amount of the transaction. Additionally, there does not need to be a restriction on the dispute amount (e.g., the dispute amount can exceed regular transfer guidelines) which makes the amount difficult to guess by an unauthorized party.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system of verifying a purported registrant's ownership or control of a payment instrument comprising:
   a communication device;
   a memory;
   a processor coupled to the communication device and to the memory; and
   a payment instrument verification module stored in the memory and executable by the processor, and adapted to:
      receive information relating to the payment instrument from a registrant;
      initiate a financial transaction involving the payment instrument via the communication device;
      generate a dispute amount for the financial transaction;
      receive via the communication device a notification from a financial institution of the registrant that the financial transaction has been disputed by a comparison amount; and
      compare the comparison amount with the dispute amount for purposes of verifying the payment instrument.

2. The system of claim 1, where the verification module verifies the payment instrument if the comparison amount matches the dispute amount.

3. The system of claim 1, wherein the verification module is further adapted to generate a notification to the registrant indicating whether the payment instrument has been verified.

4. The system of claim 1, wherein the payment instrument is a credit or debit card and the verification module initiates the financial transaction through the debit or credit card transaction processing network.

5. The system of claim 1, wherein the payment instrument is a debit card and the verification module initiates the financial transaction through an ACH network.

6. The system of claim 1, wherein the dispute amount comprises a fractional portion of a full amount of the financial transaction.

7. The system of claim 1, wherein the payment instrument verification module includes a random number generator for generating the dispute amount randomly.

8. A method by a registering service to verify use of a payment instrument belonging to a registrant comprising:
   receiving information relating to the payment instrument from the registrant;
   initiating a financial transaction with an issuer of the payment instrument;
   notifying the registrant of a dispute amount related to the financial transaction;
   receiving a notification from the issuer that the financial transaction has been disputed by a comparison amount;
   comparing, by a registering service computer, the comparison amount to the dispute amount; and
   verifying, by the registering service computer, use of the payment instrument based on a result of the comparison.

9. The method of claim 8, further comprising generating a notification to the registrant indicating whether the payment instrument has been verified.

10. The method of claim 8, wherein:
    the payment instrument is a credit or debit card; and
    the step of initiating includes initiating the financial transaction through a debit or credit card transaction processing network.

11. The method of claim 8, wherein:
    the payment instrument is a debit card; and
    the step of initiating includes initiating the financial transaction through an ACH network.

12. The method of claim 8, wherein the dispute amount is randomly generated.

13. A method by an issuer of a payment instrument belonging to a registrant to facilitate verification of the payment instrument with a registering service comprising:
    receiving, by an issuer computer, a request for a financial transaction on the payment instrument from the registering service;
    receiving a communication from the registrant disputing the financial transaction by a dispute amount;
    determining whether the registrant is authorized to use the payment instrument; and
    notifying, by the issuer computer, the registering service of a dispute of the financial transaction if it is determined that the registrant is authorized to use the payment instrument, the notification including the dispute amount.

14. The method of claim 13, further comprising:
    reversing the financial transaction upon receipt of the communication from the registrant.

15. The method of claim 13, wherein the request for a financial transaction is received from the registering service over a debit or credit card transaction processing network.

16. A computer readable storage medium containing computer program code such that, when the computer program code is executed by a processor, the processor performs a method by a registering service to verify use of a payment instrument belonging to a registrant, the method comprising:
    receiving information relating to the payment instrument from the registrant;
    initiating a financial transaction with an issuer of the payment instrument;
    notifying the registrant of a dispute amount related to the financial transaction;
    receiving a notification from the issuer that the financial transaction has been disputed by a comparison amount;
    comparing the comparison amount to the dispute amount; and
    verifying use of the payment instrument based on a result of the comparison.

17. The computer readable storage medium of claim 16, further comprising generating a notification to the registrant indicating whether the payment instrument has been verified.

18. The computer readable storage medium of claim 16, wherein:
    the payment instrument is a credit or debit card; and
    the step of initiating includes initiating the financial transaction through a debit or credit card transaction processing network.

19. The computer readable storage medium of claim 16, wherein:
    the payment instrument is a debit card; and
    the step of initiating includes initiating the financial transaction through an ACH network.

20. The computer readable storage medium of claim 16, wherein the dispute amount is randomly generated.

* * * * *